US012382263B2

(12) United States Patent
Shete et al.

(10) Patent No.: US 12,382,263 B2
(45) Date of Patent: Aug. 5, 2025

(54) APPARATUS AND METHOD FOR IMPLEMENTING R1-O1 DATA MODELS FOR O1 RELATED SERVICES WITHIN A TELECOMMUNICATIONS NETWORK

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/013,730

(22) PCT Filed: Nov. 29, 2022

(86) PCT No.: PCT/US2022/051202
§ 371 (c)(1),
(2) Date: Dec. 29, 2022

(87) PCT Pub. No.: WO2024/076354
PCT Pub. Date: Apr. 11, 2024

(65) Prior Publication Data
US 2024/0276188 A1 Aug. 15, 2024

Related U.S. Application Data

(60) Provisional application No. 63/413,392, filed on Oct. 5, 2022.

(51) Int. Cl.
H04W 4/50 (2018.01)
G06F 9/445 (2018.01)
H04W 24/02 (2009.01)

(52) U.S. Cl.
CPC ............ H04W 4/50 (2018.02); G06F 9/4451 (2013.01); H04W 24/02 (2013.01)

(58) Field of Classification Search
CPC ... H04W 24/02; H04W 16/14; H04W 88/085; H04W 84/042; H04W 24/10;
(Continued)

(56) References Cited

U.S. PATENT DOCUMENTS

2021/0184989 A1* 6/2021 Wu ........................ H04L 47/822
2023/0040563 A1* 2/2023 Pinheiro ................ H04W 72/23

FOREIGN PATENT DOCUMENTS

WO WO-2022155511 A1 * 7/2022 ......... H04L 41/0894

OTHER PUBLICATIONS

Written Opinion dated Mar. 28, 2023 Issued in International Application No. PCT/US2022/051202.
(Continued)

Primary Examiner — Quan M Hua
(74) Attorney, Agent, or Firm — Sughrue Mion, PLLC

(57) ABSTRACT

An apparatus for a non-real-time radio access network intelligence controller (NRT-RIC) framework in an O-RAN. The apparatus includes a memory storing instructions; and at least one processor configured to implement the NRT-RIC framework of an NRT-RIC by executing the instructions to: receive, from an rApp a first request for retrieving a configuration schema of a network element in the O-RAN, the first request comprising a first R1-O1 data model identifying the network element, and the first request being received via an R1 interface; and send, from the NRT-RIC framework, a first response to the requested configuration schema, the first response comprising a second R1-O1 data model identifying the network element and identifying a configuration management (CM) attribute of the network element, wherein the R1 interface enables the NRT-RIC framework and the rApp to produce and consume at least one O1 interface related R1 service in the NRT-RIC.

20 Claims, 11 Drawing Sheets

(58) Field of Classification Search
CPC ... H04W 28/24; H04W 40/246; H04W 72/00; H04W 72/11; H04W 72/51; H04W 12/02; H04W 24/08; H04W 88/12; H04W 16/18; H04W 28/18; H04W 28/02; H04W 24/04; H04W 80/02; H04W 76/11; H04W 72/115; H04L 41/0853; H04L 41/0894; H04L 41/16; H04L 41/0895; H04L 41/40; H04L 41/5009; H04L 41/5054; H04L 43/08; H04L 12/12; H04L 41/0806; H04L 41/082; H04L 41/0823

See application file for complete search history.

(56) References Cited

OTHER PUBLICATIONS

International Search Report dated Mar. 28, 2023, issued in International Application No. PCT/US2022/051202.

* cited by examiner

FIGS. 6A - 6D

| IE/Group Name | Presence | Range |
|---|---|---|
| Message Type | M | |
| Network Elements List | | 1 |
| >Network Element Item | | 1..<maxofNetworkElements> |
| >>Network Element ID | M | |

FIG. 6A: GET CM SCHEMAS REQUEST

| IE/Group Name | Presence | Range |
|---|---|---|
| Message Type | M | |
| Network Elements List | | 1 |
| >Network Element Item IEs | | 1..<maxnoofNetworkElements> |
| >>Network Element ID | M | |
| >>IOC Type of the Network Element | O | |
| >>List of associated entities | | 1 |
| >>>Associated entity item IEs | | 1..<maxnoofEntities> |
| >>>Associated entity | M | |

FIG. 6B: GET CM SCHEMAS RESPONSE- FOR EACH NETWORK ELEMENT

| IE/Group Name | Presence | Range |
|---|---|---|
| CHOICE Entry Type | M | |
| >Attribute | | |
| >>Attribute Name | M | |
| >>Attribute Definition | O | |
| >IOC | | |
| >>Supported IOC Entity | M | |

FIG. 6C: GET CM SCHEMAS RESPONSE- FOR EACH ASSOCIATED ENTITY

| IE/Group Name | Presence | Range |
|---|---|---|
| IOC Name | M | |
| List of associated entities | | 1 |
| >Associated entity item | | 1..<maxnoofNetworkElements> |
| >>Associated entity | M | |

FIG. 6D: GET CM SCHEMAS RESPONSE- FOR EACH SUPPORTED IOC ENTITY

FIGS. 7A - 7C

| IE/Group Name | Presence | Range |
|---|---|---|
| Message Type | M | |
| App ID | M | |
| Request ID | M | |
| Network Element ID | M | |
| Managed Object Instance ID | O | |
| List of associated entities | | 0..1 |
| >Associated entity item IEs | | 1..<maxnoofEntities> |
| >>Associated entity | M | |

FIG. 7A: GET (READ) CM DATA REQUEST -- FOR EACH NETWORK ELEMENT

| IE/Group Name | Presence | Range |
|---|---|---|
| CHOICE Entity Type | M | |
| >Attribute | | |
| >>Attribute Name | M | |
| >>CHOICE Attribute Type | O | |
| >>>Query Attribute | | |
| >>>List of Test Conditions | | 0..1 |
| >>>>Test Condition item IEs | | 1..<maxnoofTestConditions> |
| >>>>>Test Condition | | |
| >>>>>>Comparison | M | |
| >>>>>>Value | M | |
| >>>>>>Logical OR | M | |
| >IOC | O | |
| >>Name-contained IOC Entity | M | |

FIG. 7B: GET (READ) CM DATA REQUEST -- FOR EACH ASSOCIATED ENTITY

| IE/Group Name | Presence | Range |
|---|---|---|
| IOC Name | M | |
| Managed Object Instance ID | O | |
| List of associated entities | | 0..1 |
| >Associated entity item IEs | | 1..<maxofNetworkElements> |
| >>Associated entity | M | |

FIG. 7C: GET (READ) CM DATA REQUEST -- FOR EACH NAME-CONTAINED IOC ENTITY

FIGS. 8A - 8C

| IE/Group Name | Presence | Range |
|---|---|---|
| Message Type | M | |
| rAppID | M | |
| Subscription ID | M | |
| Network Element ID | M | |
| Managed Object Instance ID | O | |
| List of associated entities | | 0..1 |
| >Associated entity item IEs | | 1..<maxnoofEntities> |
| >>Associated entity | M | |

FIG. 8A: GET (READ) CM DATA REQUEST RESPONSE – FOR EACH NETWORK ELEMENT

| IE/Group Name | Presence | Range |
|---|---|---|
| CHOICE Entity Type | M | |
| >Attribute | | |
| >>Attribute Name | M | |
| >>Attribute Value | O | |
| >IOC | | |
| >>Name-contained IOC Entity | M | |

FIG. 8B: GET (READ) CM DATA REQUEST RESPONSE – FOR EACH ASSOCIATED ENTITY

| IE/Group Name | Presence | Range |
|---|---|---|
| IOC Name | M | |
| Managed Object Instance ID | O | |
| List of associated entities | | 0..1 |
| >Associated entity item IEs | | 1..<maxoffNetworkElements> |
| >>Associated entity | M | |

FIG. 8C: GET (READ) CM DATA REQUEST RESPONSE – FOR EACH NAME-CONTAINED IOC ENTITY

FIGS. 9A – 9C

| IE/Group Name | Presence | Range |
|---|---|---|
| Message Type | M | |
| rApp ID | M | |
| Subscription ID | M | |
| Network Element ID | M | |
| Managed Object Instance ID | O | |
| List of associated entities | | 0..1 |
| >Associated entity item IEs | M | 1..<maxnoofEntities> |
| >>Associated entity | M | |

FIG. 9A: WRITE CM REQUEST – FOR EACH NETWORK ELEMENT

| IE/Group Name | Presence | Range |
|---|---|---|
| CHOICE Entity Type | M | |
| >Attribute | | |
| >>Attribute Name | M | |
| >>Attribute Value | O | |
| >IOC | | |
| >>Name-contained IOC Entity | M | |

FIG. 9B: WRITE CM REQUEST – FOR ASSOCIATED ENTITY

| IE/Group Name | Presence | Range |
|---|---|---|
| IOC Name | M | |
| Managed Object Instance ID | O | |
| List of associated entities | | 0..1 |
| >Associated entity item IEs | M | 1..<maxofNetworkElements> |
| >>Associated entity | M | |

FIG. 9C: WRITE CM REQUEST – FOR NAME-CONTAINED IOC ENTITY

FIGS. 10A – 10C

| IE/Group Name | Presence | Range |
|---|---|---|
| Message Type | M | |
| rApp ID | M | |
| Subscription ID | M | |
| Network Element ID | M | |
| Managed Object Instance ID | O | |
| List of associated entities | | 0..1 |
| >Associated entity item IEs | | 1..<maxnoofEntities> |
| >>Associated entity | M | |

FIG. 10A: WRITE CM REQUEST RESPONSE – FOR EACH NETWORK ELEMENT

| IE/Group Name | Presence | Range |
|---|---|---|
| CHOICE Entity Type | M | |
| >Attribute | | |
| >>Attribute Name | M | |
| >>Status | M | |
| >>Cause | O | |
| >IOC | | |
| >>Name-contained IOC Entity | M | |

FIG. 10B: WRITE CM REQUEST RESPONSE – FOR EACH ASSOCIATED ENTITY

| IE/Group Name | Presence | Range |
|---|---|---|
| IOC Name | M | |
| Managed Object Instance ID | O | |
| List of associated entities | | 0..1 |
| >Associated entity item IEs | | 1..<maxofNetworkElements> |
| >>Associated entity | M | |

FIG. 10C: WRITE CM REQUEST FOR EACH NAME-CONTAINED IOC ENTITY

```
Msg type: GET CM DATA REQUEST
rApp ID: 1
Subscription ID: x1232323
Network Elements List
1>Network Element Item 0 IEs
 2>Network Element ID: 10001001 (gNB ID)
 2>List of associated entities
  3>Associated entity 0 IEs
   4>Associated entity
    5>IOC
     6>IOC Name: gNBCUCPFunction
      7>List of associated entities
       8>Associated entity 0 IEs
        9>Associated entity
         10>Attribute
          11>Attribute Name: PLMN ID
       8>Associated entity 1 IEs
        9>Associated entity
         10>IOC
          11>IOC Name: NRCellCU
           12>List of associated entities
            13>Associated entity 0 IEs
             14>Associated entity
              15>Attribute
               16>Attribute name: cellLocalID
            13>Associated entity 1 IEs
             14>Associated entity
              15>IOC
               16>IOC Name: CESManagementFunc
                17>List of ass. entities
                 18>Associated entity 0 IEs
                  19>Associated entity
                   20>Attribute
                    21>Att. name: energySavingState
                 18>Associated entity 1 IEs
                  19>Associated entity
                   20>Attribute
                    21>Att. name: energySavingControl
```

FIG. 11

APPARATUS AND METHOD FOR IMPLEMENTING R1-O1 DATA MODELS FOR O1 RELATED SERVICES WITHIN A TELECOMMUNICATIONS NETWORK

CROSS-REFERENCE TO RELATED APPLICATION(S)

This application is a National Stage of International Application No. PCT/US2022/051202 filed Nov. 29, 2022, claiming priority based on U.S. Provisional Patent Application No. 63/413,392, filed on Oct. 5, 2022, the disclosure of which is incorporated by reference herein in its entirety.

TECHNICAL FIELD

Apparatuses and methods consistent with example embodiments of the present disclosure relate to R1-O1 data models for configuration management (CM) of at least one network element in an open radio access network (O-RAN) implemented in a non-real-time radio access network intelligence controller (NRT-RIC) framework of an NRT-RIC within a Service Management and Orchestration (SMO) framework of a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC.

The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the NRT-RIC and the nRT-RIC; performing data analytics; Artificial Intelligence/ Machine Learning (AI/ML) training and inference for RAN optimization; and/or recommending configuration management actions over the O1 interface, which is the interface that connects the SMO to RAN managed elements (e.g., nRT-RIC, O-RAN Centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (O-CU, O-DU, and O-eNB) via policies. For example, the nRT sets policy parameters on activated functions of the E2 nodes. Further, the nRT-RIC hosts xApps to implement functions such as quality of service (QOS) optimization, mobility optimization, slicing optimization, interference mitigation, load balancing, security, etc. The two types of RICs work together to optimize the O-RAN. For example, the NRT-RIC provides, over the A1 interface, the policies, data, and AI/ML models enforced and used by the nRT-RIC for RAN optimization, and the nRT returns policy feedback (i.e., how the policy set by the NRT RIC works).

The SMO framework, within which the NRT-RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

The O-Cloud, on the other hand, is a cloud computing platform comprising a collection of physical infrastructure nodes that meet O-RAN requirements to host the relevant O-RAN functions (such as nRT-RIC, O-CU-CP, O-CU-UP, O-DU, etc.), the supporting software components (such as Operating System, Virtual Machine Monitor, Container Runtime, etc.) and the appropriate management and orchestration functions.

The SMO framework, within which the NRT-RIC is located, manages and orchestrates RAN elements. The SMO performs these services (i.e., management and orchestration of RAN elements through four key interfaces to the O-RAN Elements: the A1 Interface between the NRT-RIC in the SMO and the nRT-RIC for RAN Optimization; the O1 Interface between the SMO and the O-RAN Network Functions for FCAPS support; in the case of a hybrid model, an Open Fronthaul M-plane interface between SMO and O-RU for FCAPS support; the O2 Interface between the SMO and the O-Cloud to platform resources and workload management.

SUMMARY

According to embodiments, apparatuses and methods are provided for implementing a non-real-time radio access network intelligent controller (NRT-RIC) sending a plurality of requests and responses thereto that include a plurality of R1-O1 CM data models for at least one network element in an open radio access network (O-RAN). In particular, the apparatuses and methods are implemented in a non-real-time radio access network intelligence controller (NRT-RIC) framework of an NRT-RIC within a Service Management and Orchestration (SMO) framework of a telecommunications network. The apparatus and methods enable the NRT-RIC platform to communicate with at least one network element within the O-RAN based on specified R1-O1 CM data models via an R1 interface. In particular, the specified R1-O1 CM data models comprising a first and second R1-O1 CM data model for retrieving a CM data schema of the at least one network element, a third and fourth R1-O1 CM data model for reading CM data from the at least one network element, and fifth and sixth R1-O1 data model for writing CM data to at least one network element. The plurality of the R1-O1 CM data model allows a network operator to effectively manage (standardize) rApp applications from multiple vendors to define requirements for the NRT-RIC platform.

According to an embodiment, an apparatus for a non-real-time radio access network intelligence controller (NRT-RIC) framework in an open radio access network (O-RAN), the apparatus includes a memory storing instructions; and at least one processor configured to implement the NRT-RIC framework of an NRT-RIC by executing the instructions to: receive, from an rApp hosted by the NRT-RIC, a first request for retrieving a configuration schema of at least one network element in the O-RAN, the first request comprising a first R1-O1 configuration management (CM) data model identifying the at least one network element, and the first request being received via an R1 interface within the O-RAN architecture between rApps and the NRT-RIC framework; and send, from the NRT-RIC framework to the rApp via the R1 interface, a first response to the requested configuration schema, the first response comprising a second R1-O1 CM data model identifying the at least one network element and identifying at least one CM attribute of the at least one network element, wherein the R1 interface enables the NRT-RIC framework and the rApp to produce and consume at least one O1 interface related R1 service in the NRT-RIC.

The first R1-O1 CM data model may include a message type parameter identifying a type of the first request; and at least one network element parameter comprising a network element identifier (ID).

The second R1-O1 CM data model may include a message type parameter identifying a type of the first response; and for each of the at least one network element, a supported Information Object Class (IOC) entity parameter including one or more associated entity items identifying one or more CM attributes.

The at least one processor may be further configured to execute the instructions to receive, from the rApp, a second request for reading configuration data of a CM attribute, among the at least one CM attribute identified in the first response, the second request comprising a third R1-O1 CM data model identifying a network element and the CM attribute, and the second request being received via the R1 interface; and send, from the NRT-RIC framework to the rApp via the R1 interface, a second response comprising a fourth R1-O1 CM data model identifying the CM attribute in response to the second request.

The third R1-O1 CM data model may include a message type parameter identifying a type of the second request; an rApp identifier (ID) identifying the rApp; a request identifier (ID) for the second request; a network element parameter comprising a network element ID of the network element; and a first name-contained IOC entity parameter including an IOC entity name and a first associated entity item identifying the CM attribute.

The fourth R1-O1 CM data model may include a message type parameter identifying a type of the second response; the rApp ID identifying the rApp; a network element parameter comprising the network element identifier (ID); a second name-contained IOC entity parameter including the IOC entity name and a second associated entity item identifying the CM attribute.

The second associated entity item further may include a CM attribute value identifying a value of the CM attribute.

The at least one processor may be further configured to execute the instructions to: receive, from the rApp, a third request for writing configuration data of a CM attribute, among the at least one CM attribute, the third request comprising a fifth R1-O1 CM data model identifying a network element and the CM attribute, and the third request being received via the R1 interface; and send, from the NRT-RIC framework to the rApp via the R1 interface, a third response comprising a sixth R1-O1 CM data model for identifying the CM attribute modified in response to the third request.

The fifth R1-O1 CM data model may include a message type parameter identifying a type of the third request; an rApp ID identifying the rApp; a network element parameter comprising a network element identifier (ID) of the network element; a third name-contained IOC entity parameter including an IOC entity name and a third associated entity item identifying the CM attribute to be modified in response to the third request.

The sixth R1-O1 CM data model may include a message type parameter identifying a type of the third response; the rApp ID; a network element parameter comprising the network element identifier (ID); an attribute status acknowledging the configuration status; and a fourth name-contained IOC entity parameter including the IOC entity name and a fourth associated entity item identifying the CM attribute and a status of the writing.

Based on the writing not being accepted, the fourth associated entity item further may include a Cause parameter identifying a cause of the writing not being accepted.

According to an embodiment, a method for a non-real-time radio access network intelligence controller (NRT-RIC) framework in an open radio access network (O-RAN), the method includes: receiving, from an rApp hosted by an NRT-RIC, a first request for retrieving a configuration schema of at least one network element in the O-RAN, the first request comprising a first R1-O1 CM data model identifying the at least one network element, and the first request being received via an R1 interface within the O-RAN architecture between rApps and the NRT-RIC framework; and sending, from the NRT-RIC framework to the rApp via the R1 interface, a first response to the requested configuration schema, the first response comprising a second R1-O1 CM data model identifying the at least one network element and identifying at least one configuration management (CM) attribute of the at least one network element, wherein the R1 interface enables the NRT-RIC framework and the rApp to produce and consume at least one O1 interface related R1 service in the NRT-RIC.

The first R1-O1 CM data model may be include a message type parameter identifying a type of the first request; and at least one network element parameter comprising a network element identifier (ID).

The first R1-O1 CM data model may be include a message type parameter identifying a type of the first request; and at least one network element parameter comprising a network element identifier (ID).

The second R1-O1 CM data model may be include a message type parameter identifying a type of the first response; and for each of the at least one network element, a supported Information Object Class (IOC) entity parameter including one or more associated entity items identifying one or more CM attributes.

The method may further include receiving, from the rApp, a second request for reading configuration data of a CM attribute, among the at least one CM attribute identified in the first response, the second request comprising a third R1-O1 CM data model identifying a network element and the CM attribute, and the second request being received via the R1 interface; and sending, from the NRT-RIC framework to the rApp via the R1 interface, a second response comprising a fourth R1-O1 CM data model identifying the CM attribute in response to the second request.

The method may further include: receiving, from the rApp, a third request for writing configuration data of a CM attribute, among the at least one CM attribute, the third request comprising a fifth R1-O1 CM data model identifying a network element and the CM attribute, and the third request being received via the R1 interface; and sending, from the NRT-RIC framework to the rApp via the R1 interface, a third response comprising a sixth R1-O1 CM data model for identifying a CM attribute to be modified in response to the third request.

According to an embodiment, a non-transitory computer-readable recording medium having recorded thereon instructions executable by at least one processor configured to perform a method for a non-real-time radio access network intelligence controller (NRT-RIC) framework in an open radio access network (O-RAN), the method includes: receiving, from an rApp hosted by an NRT-RIC, a first request for retrieving a configuration schema of at least one network element in the O-RAN, the first request comprising a first R1-O1 CM data model identifying the at least one network element, and the first request being received via an R1 interface within the O-RAN architecture between rApps and the NRT-RIC framework; and sending, from the NRT-RIC framework to the rApp via the R1 interface, a first response to the requested configuration schema, the first response comprising a second R1-O1 CM data model identifying the at least one network element and identifying at least one configuration management (CM) attribute of the at least one network element, wherein the R1 interface enables the NRT-RIC framework and the rApp to produce and consume at least one O1 interface related R1 service in the NRT-RIC.

The method may further include: receiving, from the rApp, a second request for reading configuration data of a CM attribute, among the at least one CM attribute identified in the first response, the second request comprising a third R1-O1 CM data model identifying a network element and the CM attribute, and the second request being received via the R1 interface; and sending, from the NRT-RIC framework to the rApp via the R1 interface, a second response comprising a fourth R1-O1 CM data model identifying the CM attribute in response to the second request.

The method may further include: receiving, from the rApp, a third request for writing configuration data of a CM attribute, among the at least one CM attribute, the third request comprising a fifth R1-O1 CM data model identifying a network element and the CM attribute, and the third request being received via the R1 interface; and sending, from the NRT-RIC framework to the rApp via the R1 interface, a third response comprising a sixth R1-O1 CM data model for identifying a CM attribute to be modified in response to the third request.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIGS. 6A-6D describe the first R1-O1 CM data model of the first request (i.e., initial message) "CM SCHEMAS REQUEST" and the second R1-O1 CM data model of the first response "GET CM SCHEMAS RESPONSE" or "GET CM SCHEMAS FAILURE" according to an example embodiment;

FIGS. 7A-7C describe the third R1-O1 CM data model of the second request "GET (READ) CM DATA REQUEST" according to an example embodiment;

FIGS. 8A-8C describe the fourth R1-O1 CM data model of the second response "GET CM DATA REQUEST RESPONSE" or "GET PM DATA REQUEST FAILURE" according to an example embodiment;

FIGS. 9A-9C describe the fifth R1-O1 CM data model of the third request "WRITE CM REQUEST" according to an example embodiment;

FIGS. 10A-10C describe the sixth R1-O1 CM data model of the third response "WRITE CM REQUEST RESPONSE" or "WRITE CM REQUEST FAILURE" according to an example embodiment; and FIG. 11 illustrates an example embodiment of the third R1-O1 CM data model for the second request "GET (READ) CM DATA REQUEST".

DETAILED DESCRIPTION

The following detailed description of exemplary embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
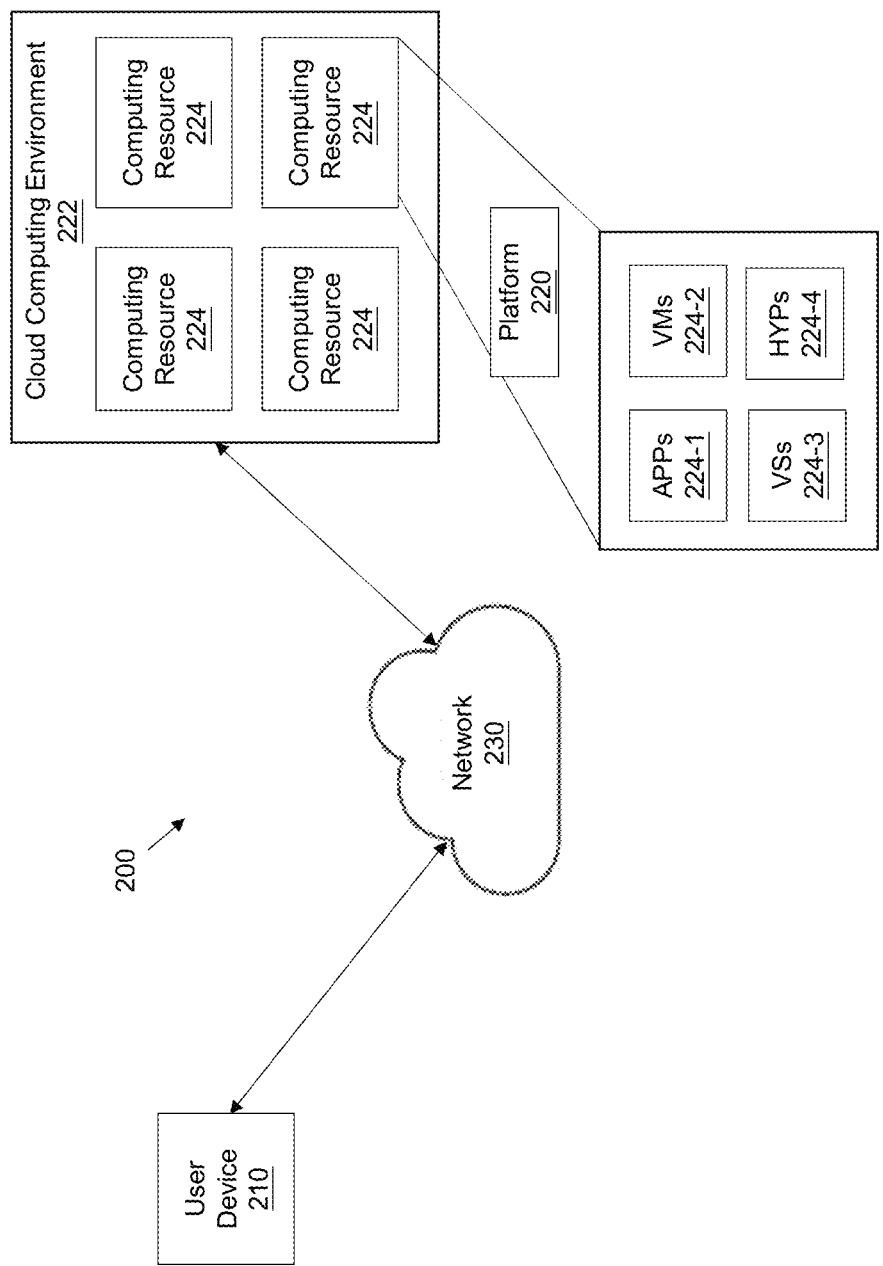
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 220. Devices of environment 200 may interconnect via wired connections, wireless connections, or a combination of wired and wireless connections. In embodiments, any of the functions and operations described with reference to FIGS. 4 through 11 below may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc., services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 220 includes one or more wired and/or wireless networks. For example, network 220 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
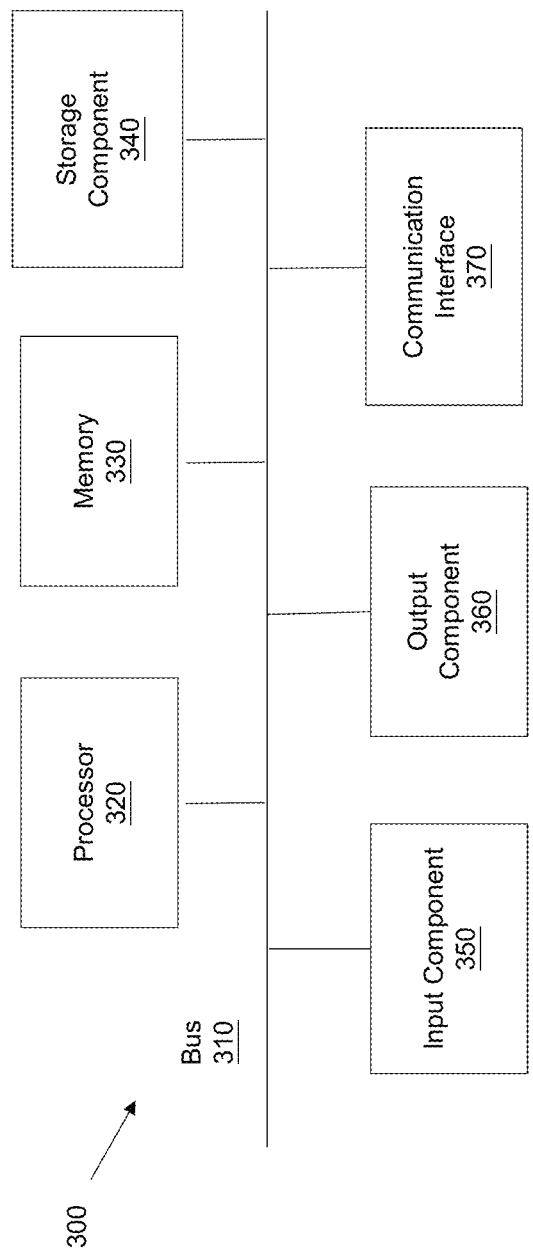
FIG. 3 is a diagram of example components of a device according to an embodiment.

FIG. 3 is a diagram of example components of a device 300. Device 300 may correspond to user device 210 and/or platform 220. As shown in FIG. 3, device 300 may include a bus 310, a processor 320, a memory 320, a storage component 330, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 320 includes a random-access memory (RAM), a read-only memory (ROM), and/or another type of dynamic or static storage device (e.g., a flash memory, a magnetic memory, and/or an optical memory) that stores information and/or instructions for use by processor 320.

Storage component 330 stores information and/or software related to the operation and use of device 300. For example, storage component 330 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 320 and/or storage component 330. A computer-readable medium is defined herein as a non-transitory memory device. A memory device includes memory space within a single physical storage device or memory space spread across multiple physical storage devices.

Software instructions may be read into memory 320 and/or storage component 330 from another computer-readable medium or from another device via communication interface 370. When executed, software instructions stored in memory 320 and/or storage component 330 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 1:
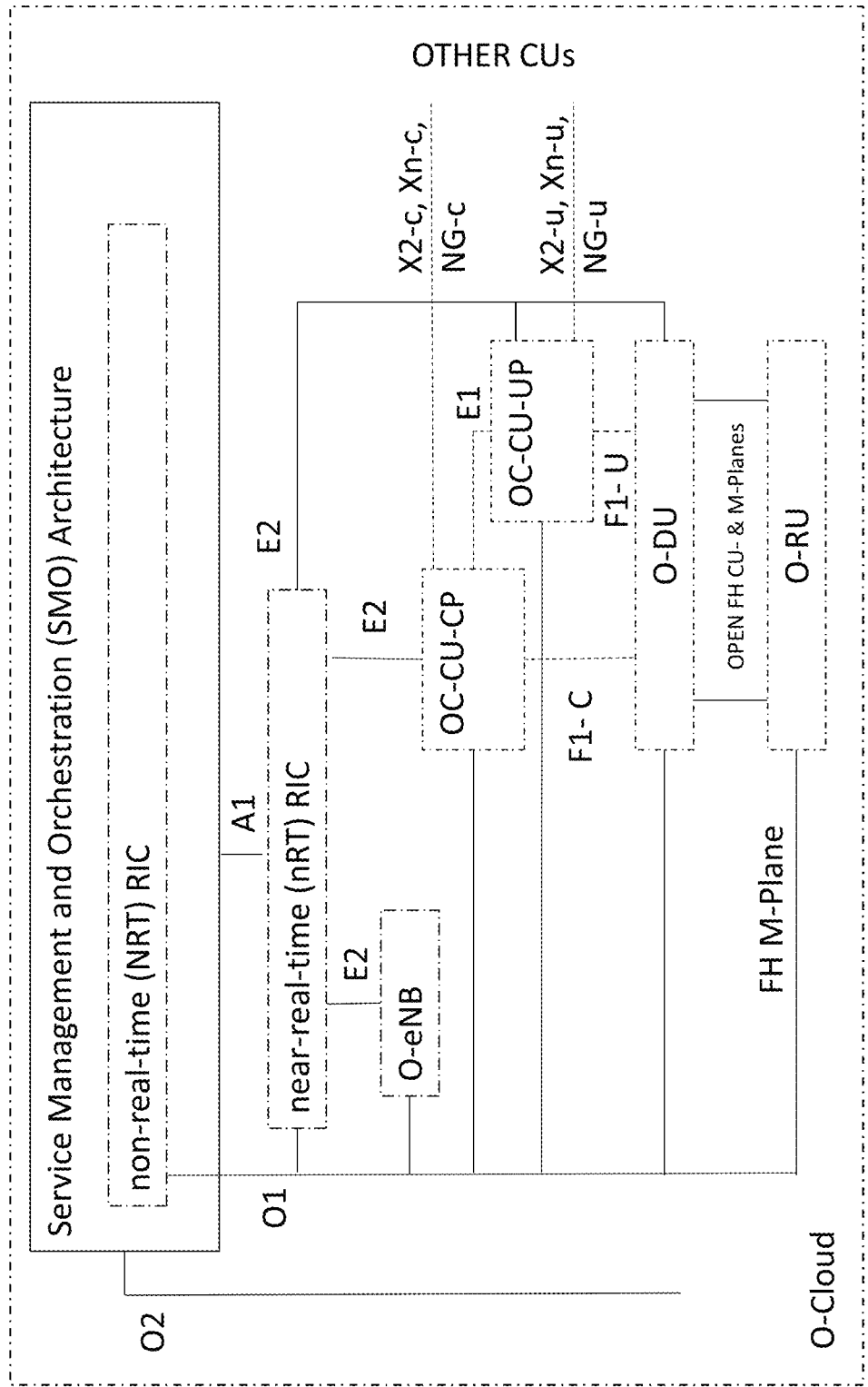
FIG. 1 illustrates an O-RAN architecture in the related art.

In embodiments, any one of the operations or processes of FIGS. 4 to 11 may be implemented by or using any one of the elements illustrated in FIGS. 1 to 3.

Figure 4:
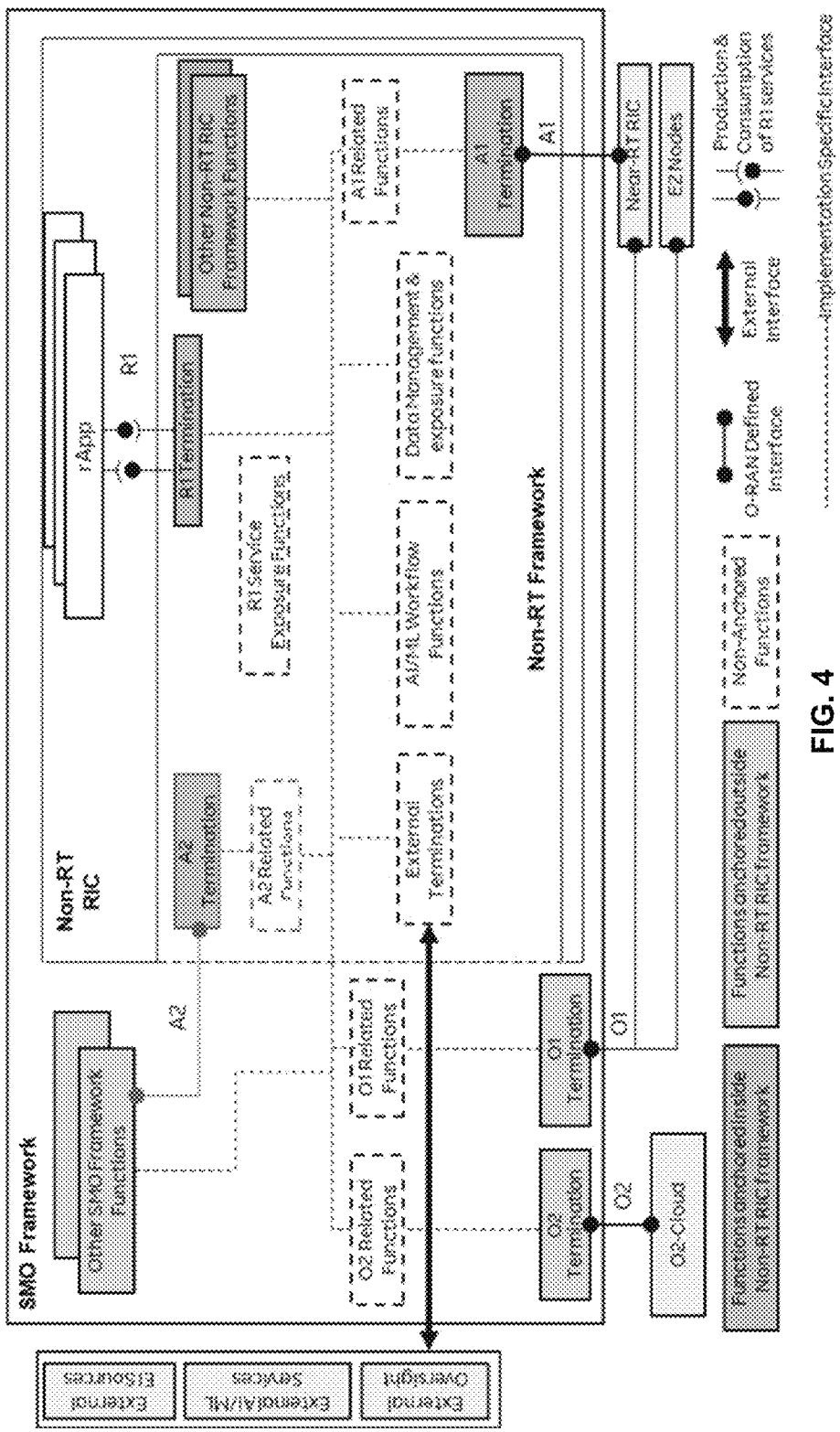
FIG. 4 illustrates the NRT-RIC framework within the O-RAN according to an embodiment.

FIG. 4 illustrates the NRT-RIC framework (or platform) and the rApp hosted by the NRT-RIC with regard to the R1 interface within the SMO framework system architecture and the O1, O2, A1 interface within an O-RAN according to an embodiment.

Referring to FIG. 4, the NRT-RIC represents a subset of functionalities of the SMO framework. The NRT-RIC can access other SMO framework functionalities and thereby influence (i.e., controls and/or executes) what is carried across the O1 and O2 interface (e.g., performing configuration management (CM) and/or performance management (PM)).

The NRT-RIC includes an NRT-RIC framework. The NRT-RIC framework, among a plurality of other functions, includes R1 service exposure functions that handle R1 services provided in accordance with example embodiments. In general, the NRT-RIC functions within the NRT-RIC framework support the authorization, authentication, registration, discovery, communication support, etc. for the rAPPs.

NRT-RIC Applications (rApps) are applications that leverage the functionalities available in the NRT-RIC framework and/or SMO Framework to provide value-added services related to RAN operation and optimization. The scope of rApps includes, but is not limited to, radio resource management, data analytics, etc., and enrichment of information.

To this end, the NRT-RIC framework produces and/or consumes R1 services according to example embodiments via an R1 interface. The R1 interface terminates in an R1 termination of the NRT-RIC framework. The R1 termination connects to the NRT-RIC framework and the rApps via the R1 interface and enables the NRT-RIC framework and rApps to exchange messages/data (i.e., requests and responses comprising of data models) to access the R1 services via the R1 interface.

Moreover, the NRT-RIC framework comprises A1-related functions. The A1-related functions of the NRT-RIC framework support, for example, A1 logical termination, A1-policy coordination and catalog, A1-E1 coordination and catalog, etc.

The data management and exposure services within the NRT-RIC framework deliver data created or collected by data producers to data consumers according to their needs (e.g., function management (FM)/consumption management (CM)/production management (PM) data to rApps or CM changes from rApps to the O-RAN via the O1 interface.

The NRT-RIC framework further comprises External Terminations. The External Terminations, for example, support an exchange of data between the NRT-RIC framework and external AI/ML functions, Enrichment Information (E1) Sources, or an External Oversight.

Within the NRT-RIC framework, the AI/ML workflow services provide access to AI/ML workflow. For example, the AI/ML workflow services may assist in training models, monitoring, etc. the deployed AI/ML models in NRT-RIC.

Moreover, the NRT-RIC framework comprises A2-related functions that support, for example, A2 logical termination, A2-Policy coordination and catalog, etc.

Still referring to FIG. 4, within the NRT-RIC, the R1 interface is an open logical interface within the O-RAN architecture between the rApps and the NRT-RIC framework of the NRT-RIC. The R1 interface supports the exchange of control signaling information and the collection and delivery of data between endpoints. The R1 interface enables, for example, multivendor rApps to consume and/or produce the R1 services.

The R1 interface is independent of specific implementations of the SMO and NRT-RIC framework of the NRT-RIC. The R1 interface is defined in an extensible way that enables new services and data types to be added without needing to change the protocols or the procedures.

In particular, the R1 interface facilitates the interconnection between rApps and the NRT-RIC framework supplied by different vendors (i.e., facilitates interconnection in a multivendor environment). To this end, the R1 interface provides a level of abstraction between the rApps and NRT-RIC Framework and/or SMO Framework.

In the related art, R1-O1 CM data models and data types definitions of O1-related services in the NRT-RIC framework of the NRT-RIC are not specified.

A framework of an R1 interface telemetry data TD according to an embodiment specifies data models and types. The data models may include an R1-Service Management & Exposure (SME) data model, an R1-Data Management & Exposure (DME) data model, an R1-A1 data model, an R1-O2 data model, an R1-AIML data model and an R1-O1 data model. The R1-O1 data model may include an O1-CM data model, O1-NI data model, O1-PM data model and O1-FM data model. Hereinbelow, CM data models according to example embodiments are described.

Meanwhile, the data types may include R1-SME data types, R1-DME data types, R1-A1 data types, R1-O2 data types, R1-AIML data types and R1-O1 data types. The R1-O1 data types may comprise O1-CM data types, O1-NI data types, O1-PM data types and O1-FM data types.

Figure 5:
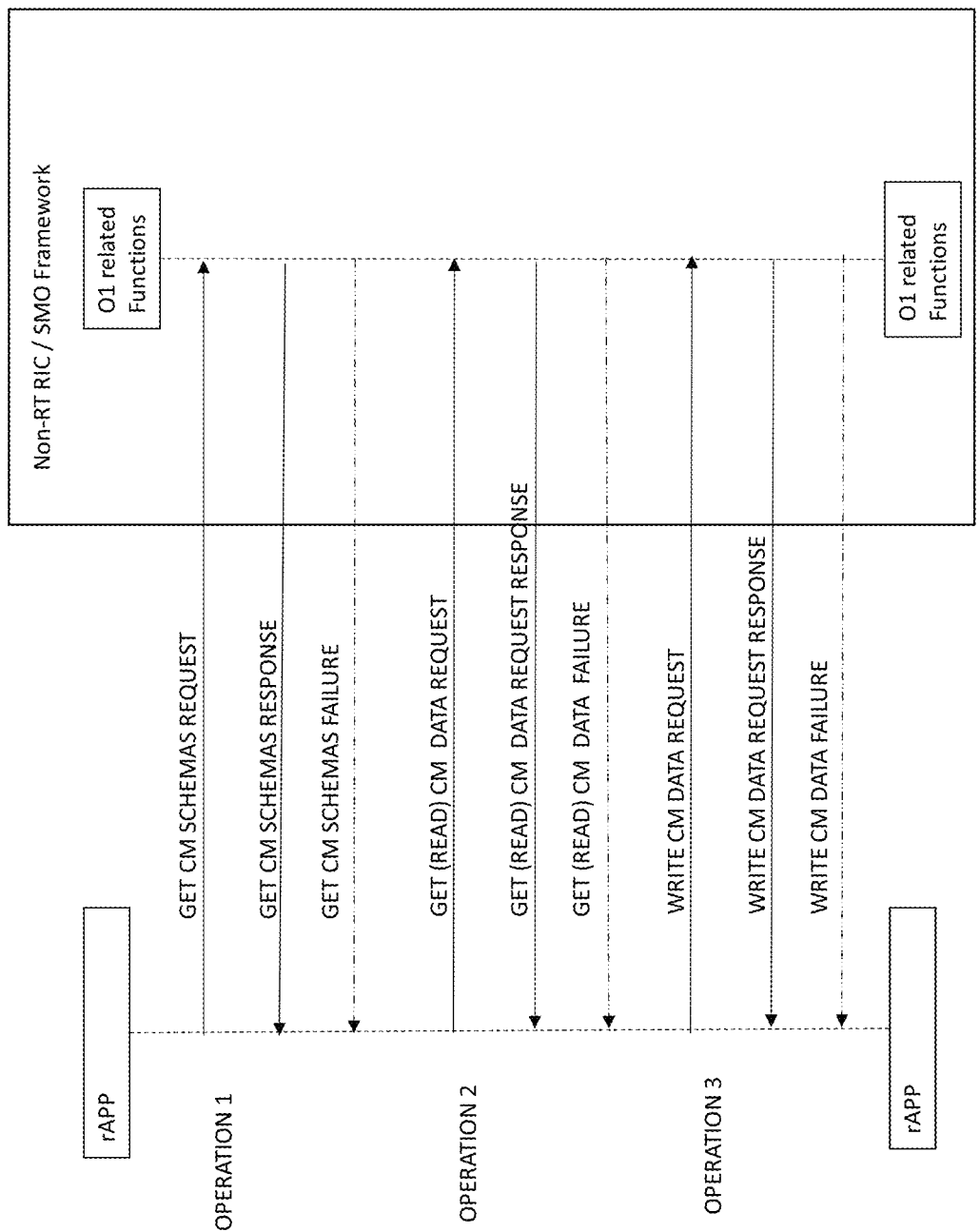
FIG. 5 illustrates the flow of requests and responses that refer to a plurality of R1-O1 CM data models for at least one network element from an rApp via an R1 interface to the NRT-RIC framework of the NRT-RIC according to one embodiment.

FIG. 5 illustrates the flow of requests and responses that refer to a plurality of R1-O1 CM data models for at least one network element from an rApp via an R1 interface to the NRT-RIC framework of the NRT-RIC according to one embodiment.

Referring to FIG. 5, the R1 interface telemetry data TD for O1-related R1 services comprises a plurality of R1-O1 CM data models for a plurality of requests and responses.

In operation 1, among the plurality of requests and responses, an rApp hosted by the NRT-RIC, sends the first request for retrieving a configuration schema "GET CM SCHEMAS REQUEST" via the R1 interface to the NRT-RIC framework. The NRT-RIC framework (i.e., the O1-related functions of the NRT-RIC framework) obtains the first request and comprises a first R1-O1 CM data model identifying at least one network element (e.g., CU, DU, etc.) within the O-RAN architecture according to FIG. 1 or 4.

The first request "GET CM SCHEMAS REQUEST" is an initial message to request the CM schema of an O1-related service from at least one network element in the O-RAN. The CM schema may depend on the vendor of the O1-related service or the vendor (s) of at least one network element. To this end, based on the first request (i.e., the initial "GET CM SCHEMAS REQUEST"), the rApp requests the NRT-RIC framework (i.e., the O1-related functions of the NRT-RIC framework) to identify the CM schema of the at least one network element in the O-RAN by identifying at least one CM attribute of the at least one network element.

Based on at least one CM attribute of at least one network element, the rApp identifies CM schema for at least one network element. To this end, the rApp retrieves a first response "GET CM SCHEMAS RESPONSE" to the requested CM schema from the NRT-RIC framework via the R1 interface.

The first response comprises a second R1-O1 data model identifying the at least one network element and identifying at least one configuration management (CM) attribute of the at least one network element. In particular, the rApp identifies the at least one configuration management (CM)

attribute based on supported Information Object Class (IOC) entity parameter including one or more associated entity items that identify one or more CM attributes (i.e., identifies the CM schema of the vendor dependent O1 related services).

As a result, the rApp may select the structure (i.e., syntax) of the plurality R1-O1 CM data models following the identification of the CM schema of the vendor-dependent O1-related services.

The identification of one or more CM attributes enables the rApp to select a data structure (i.e., syntax) of the plurality R1-O1 CM data models that fits the data structure (i.e., syntax) of the at least one network element.

As a result, the identification of the one or more CM attributes allows the NRT-RIC framework and the rApp to produce and/or consume at least one O1-related R1 service in the NRT-RIC.

Still referring to operation 1, in an example embodiment, in case the "GET CM SCHEMAS REQUEST" fails, the first response may be a "GET CM SCHEMAS FAILURE".

In operation 2, upon identifying the schema for the at least one network element, the NRT-RIC framework of the NRT-RIC receive, from the rApp, a second request for reading configuration data of a CM attribute, among the at least one CM attribute, the second request comprising a third R1-O1 data model identifying a network element and the CM attribute, and the second request being received via the R1 interface.

The third R1-O1 CM data model includes a message type parameter identifying a type of the second request. For example, the second request is a "GET CM DATA REQUEST" for reading configuration data of the CM attribute. In response to the second request, the NRT-RIC framework of the NRT-RIC sends a second response "GET CM DATA REQUEST RESPONSE" comprising a fourth R1-O1 CM data model. The fourth R1-O1 data model identifies a name and/or a value of the CM attribute.

In an example embodiment, the third R1-O1 CM data model of the second request includes at least one test condition to test the CM attribute (i.e., compare a CM attribute in accordance with a test condition) to retrieve a value of the comparison (e.g., check for the correct release version, correct maintenance parameter, etc.).

To this end, the third R1-O1 CM data model of the second request includes an attribute name identifying the CM attribute. Moreover, based on the attribute name the third R1-O1 CM data model of the second request may comprise at least one test condition for the CM attribute (e.g., the third R1-O1 CM data model of the second request includes at least one test condition for testing the CM attribute (e.g., checking whether a CM attribute was correctly updated, the CM attribute exists, etc.). To this end, in an example embodiment, the third R1-O1 data model may include a comparison parameter and Logical OR parameter, wherein the Logical OR parameter may be enumerated as true or false.

Referring to operation 2, in an example embodiment, in case the "GET CM SCHEMAS REQUEST" fails, the second response may be a "GET PM DATA REQUEST FAILURE".

In operation 3, the NRT-RIC framework of the NRT-RIC receives, from the rApp, a third request "WRITE CM REQUEST" for writing configuration data of a CM attribute, among at least one CM attribute, the third request "WRITE CM REQUEST" comprising a fifth R1-O1 CM data model identifying a network element and the CM attribute, and the third request "WRITE CM REQUEST" being received via the R1 interface. In the third request "WRITE CM REQUEST" a CM attribution name and/or CM attribution value for at least one network element within the O-RAN may be pushed to the NRT-RIC framework of the NRT-RIC.

Upon obtaining the third request for writing configuration data of a CM attribute, the NRT-RIC framework of the NRT-RIC sends a third response "WRITE CM REQUEST RESPONSE" comprising a sixth R1-O1 CM data model for identifying a CM attribute modified in response to the third request to the rApp via the R1 interface (e.g., the third response may include a confirmation of the CM attribute name or a CM attribute value to confirm the write request). CM attribute name may be a generic name for a CM attribute. For example, a CM attribute name may be a generic name such as "energy saving control", etc.

Referring to operation 3, in an example embodiment, in case the "WRITE CM REQUEST" fails, the third response may be a "WRITE CM FAILURE".

FIGS. 6A-6D describe the first R1-O1 CM data model of the first request (i.e., initial message) "CM SCHEMAS REQUEST" and the second R1-O1 CM data model of the first response "GET CM SCHEMAS RESPONSE" or "GET CM SCHEMAS FAILURE" according to an example embodiment.

Referring to FIG. 6A, the first request (i.e., initial message) "CM SCHEMAS REQUEST" includes a first R1-O1 CM data model for each of the network elements. The first R1-O1 CM data model includes at least one of the following parameters: a message type, a network elements list (i.e., at least one network element) comprising of a network element Item IE(s), and an Element ID for each of the one or more network elements, wherein the presence of the message type and the network element ID may be mandatory. In an example embodiment, the network elements list nests a number <max. of network elements> of network element Items each having a network element ID.

Referring to FIG. 6B, the first response "GET CM SCHEMAS RESPONSE" includes a second R1-O1 CM data model for each network element. The second R1-O1 CM data model includes at least one of the following parameters: a message type, network elements list (i.e., at least one network element) comprising of a network element Item IE(s), and an Element ID parameter for each of the one or more network elements, an IOC Type of the network element, a list of associated entities, associated entity item IEs nesting one or more associated entities, wherein the presence of the message type and the network element ID and one or more associated entities may be mandatory. The presence of the IOC Type of the network element parameter may be optional.

In an example embodiment, the network elements list may comprise a number <max. of network elements> of network element Items IEs. In another example embodiment, associated entity item IEs may comprise a number <max. no. of Entities> of one or more associated entities.

Referring to FIG. 6C, the second R1-O1 CM data model for each associated entity further includes at least one of the following parameters: a CHOICE Entity Type, an Attribute, an Attribute Name, an Attribute Definition, an IOC parameter including a supported IOC Entity, wherein the presence of the CHOICE Entity Type and the Attribute Name and the supported IOC Entity may be mandatory. The presence of the Attribute Definition may be optional.

Referring to FIG. 6D, the second R1-O1 CM data model for each supported IOC entity further includes at least one of the following parameters: an IOC Name, a List of associated entities (i.e., one or more associated entities) comprising an Associated entity item IEs, and an Associated Entity parameter for each of the one or more Associated Entities, wherein the presence of the IOC Name and the Associated Entity parameter may be mandatory.

In an example embodiment, the list of associated entities may comprise a number <max. of network elements> of Associated Entity item IE(s).

FIGS. 7A-7C describe the third R1-O1 CM data model of the second request "GET (READ) CM DATA REQUEST" according to an example embodiment.

Referring to FIG. 7A, a second request "GET (READ) CM DATA REQUEST" for requesting read configuration data of one or more network elements (NEs). The second request includes a third R1-O1 CM data model. The third R1-O1 CM data model includes at least one of the following parameters: a message type, an rApp ID, a Request ID, a network element ID, a Managed Object Instance ID, a list of associated entities (i.e., one or more Associated Entities) comprising an Associated Entity item IEs, and an Associated Entity parameter for each of the one or more Associated Entity item IEs, wherein the presence of the message type, rApp ID, Request ID, network element ID and one or more Associates Entities may be mandatory. The presence of the Managed Object Instance ID may be optional.

In an example embodiment, the list of Associated Entities may comprise a number <max. no. of Entities> of Associated Entity item IEs.

Referring to FIG. 7B, the third R1-O1 CM data model for each of the one or more Associated Entities comprises at least one of the following parameters: a CHOICE Entity Type, an Attribute, an Attribute Name, a CHOICE Attribute Type (i.e., the attribute type based on the choice of attribute), a Query Attribute based on the CHOICE Attribute Type, a list of Test Conditions (i.e., one or more test conditions) comprising a Test Condition Item IEs, and a Test Condition parameter for each of the one or more test conditions, a Comparison parameter of the one or more test conditions, a Value of the Comparison, a Logical OR combination logic of the Comparison, an IOC parameter, a Name-contained IOC Entity, wherein the presence of the CHOICE Entity Type, Attribute, Test Condition, Comparison parameter and Value of the Comparison may be mandatory. The presence of the CHOICE Attribute Type and the Logical OR combination logic may be optional.

For example, the test condition may be a test to check to the version or a configuration status according to a CM attribute for each associated entity.

In an example embodiment, the list of test conditions may comprise a number <max. no. of Test Conditions> of Test Condition Item IEs. In another example embodiment, the Logical OR combination logic of values of the comparison may be enumerated as true, false, etc.

Referring to FIG. 7C, the third R1-O1 CM data model for requesting read configuration data of one or more name-contained IOC entities includes at least one of the following parameters: an IOC Name, a Managed Object Instance ID, a list of associated entities (i.e., one or more Associated Entities) comprising an Associated entity item IEs, and an Associated Entity parameter for each of the one or more Associated Entities, wherein the presence of the IOC Name parameter and one or more Associated Entities may be mandatory. The Managed Object Instance ID parameter may be optional.

In an example embodiment, the list of Associated Entities may comprise a number <max. of network elements> of one or more Associated entity item IEs.

FIGS. 8A-8C describe the fourth R1-O1 CM data model of the second response "GET CM DATA REQUEST RESPONSE" or "GET PM DATA REQUEST FAILURE" according to an example embodiment.

Referring to FIG. 8A, the fourth R1-O1 CM data model of the second response "GET (READ) CM DATA REQUEST RESPONSE" for one or more NEs includes at least one of the following parameters: a message type, an rApp ID, a Subscription ID, a network element ID, a Managed Object Instance ID, a list of associated entities (i.e., one or more associated entities) comprising one or more Associated entity item IEs, and an Associated Entity parameter for each of the one or more Associated Entities, wherein the presence of the message type, the rApp ID, the Subscription ID, the network element ID and the one or more Associates Entity may be mandatory. The presence of the Managed Object Instance ID data may be optional. In accordance with one or more example embodiments, at least the network element ID, the Managed Object Instance ID, and the list of associated entities may be included for each of plural network elements.

In an example embodiment, the list of Associated Entities data may comprise a number <max. no. of Entities> of one or more Associated entity item IEs.

Referring to FIG. 8B, the fourth R1-O1 CM data model for one or more associated entities comprises at least one of the following parameters: a CHOICE Entity Type, an Attribute, an Attribute Name, an Attribute Value, an IOC parameter, and a Name-contained IOC Entity, wherein the presence of the CHOICE Entity Type, the Attribute Name and the Name-contained IOC Entity may be mandatory. The presence of the Attribute Value may be optional.

Referring to FIG. 8C, the fourth R1-O1 CM data model for one or more name-contained IOC entities comprises at least one of the following parameters: IOC Name, Managed Object Instance ID, a list of associated entities (i.e., one or more Associated Entities) comprising an Associated entity item IEs parameter, and an Associated Entity parameter for each of the one or more Associated Entities, wherein the presence of the IOC Name and the one or more Associated Entities may be mandatory. The Managed Object Instance ID may be optional.

In an example embodiment, the list of associated entities may comprise a number <max. of network elements> of Associated entity item IEs.

FIGS. 9A-9C describe the fifth R1-O1 CM data model of the third request "WRITE CM REQUEST" according to an example embodiment.

Referring to FIG. 9A, the fifth R1-O1 CM data model for one or more NEs includes at least one of the following parameters: a message type, an rApp ID, a Subscription ID, a network element ID, a Managed Object Instance ID, a list of associated entities (i.e., one or more Associated Entities) comprising one or more Associated entity item IEs, and an Associated Entity parameter for each of the one or more Associated Entities, wherein the presence of the message type, the rApp ID, the Subscription the ID, the network element ID and the one or more Associates Entities may be mandatory. The presence of the Managed Object Instance ID data may be optional. In accordance with one or more example embodiments, at least the network element ID, the Managed Object Instance ID, and the list of associated entities may be included for each of plural network elements.

In an example embodiment, the list of associated entities may comprise a number <max. no. of Entities> of the one or more Associated entity item IEs.

Referring to FIG. 9B, the fifth R1-O1 CM data model for one or more associated entities comprises at least one of the following parameters: a CHOICE Entity Type, an Attribute, an Attribute Name, an Attribute, a Value and a Name-contained IOC Entity, wherein the presence of the CHOICE Entity Type, the Attribute Name and the Name-contained IOC Entity may be mandatory. The presence of the Attribute Value may be optional.

Referring to FIG. 9C, the fifth R1-O1 CM data model for the name-contained IOC entities comprises at least one of the following parameters: an IOC Name, Managed Object Instance ID, a list of associated entities (i.e., one or more associated entities) comprising an Associated entity item IEs, and an Associated Entity parameter for each of the one or more Associated Entities, wherein the presence of the IOC Name parameter and the one or more Associated Entities may be mandatory. The Managed Object Instance ID may be optional. In an example embodiment, the list of associated entities may comprise a number <max. of network elements> of the Associated entity item IEs.

FIGS. 10A-10C describe the sixth R1-O1 CM data model of the third response "WRITE CM REQUEST RESPONSE" or "WRITE CM REQUEST FAILURE" according to an example embodiment.

Referring to FIG. 10A, the sixth R1-O1 CM data model of the third response to write configuration changes "WRITE CM REQUEST RESPONSE" or "WRITE CM REQUEST FAILURE" for one or more NEs includes at least one of the following parameters: a message type, an rApp ID, a Subscription ID, a network element ID, a Managed Object Instance ID, a list of associated entities (i.e., one or more Associated Entities) comprising one or more Associated entity item IEs, and an Associated Entity parameter for each of the one or more Associated Entities, wherein the presence of the message type, the rApp ID, the Subscription ID, the network element ID and the one or more Associates Entities may be mandatory. The presence of the Managed Object Instance ID may be optional. In accordance with one or more example embodiments, at least the network element ID, the Managed Object Instance ID, and the list of associated entities may be included for each of plural network elements.

In an example embodiment, the list of associated entities may comprise a number <max. no. of Entities> of the Associated entity item IEs.

Referring to FIG. 10B, the sixth R1-O1 data model for one or more associated entities includes at least one of the following parameters: a CHOICE Entity Type, an Attribute, an Attribute Name, a Status (i.e., the status parameter may be an acknowledgment of a status or a status change), a Cause (i.e., a description of the cause leading to the status), a Name-contained IOC Entity parameter, wherein the presence of the CHOICE Entity Type, the Attribute Name and the Name-contained IOC Entity may be mandatory. The presence of the Cause may be optional.

Referring to FIG. 10C, the sixth R1-O1CM data model for one or more name-contained IOC entities comprises at least one of the following parameters: an IOC Name, a Managed Object Instance ID, a list of associated entities (i.e., one or more Associated Entities) comprising Associated entity item IEs, and an Associated Entity parameter for each of the one or more Associated Entities, wherein the presence of the IOC Name and the one or more Associated Entities may be mandatory. The Managed Object Instance ID data may be optional.

In an example embodiment, the list of associated entities may comprise a number <max. of network elements> of the Associated entity item IEs.

FIG. 11 illustrates an example of the third R1-O1 CM data model for the second request "GET (READ) CM DATA REQUEST".

Referring to FIG. 11, an example of the third request "GET CM DATA REQUEST" as set forth in FIG. 7. The "GET CM DATA REQUEST" includes the third R1-O1 CM data model for the one or more network elements, the third R1-O1 CM data model for the one or more Associated Entities and the R1-O1 CM data model third data model one or more name-contained IOC entities, respectively.

In particular, the third request "GET CM DATA REQUEST" according to the example embodiment, shows the Message type: GET CM DATA REQUEST for an rApp ID: 1 with a Subscription ID: x1232323.

Referring to FIG. 11, the network elements list includes one network element. The network element Item IE parameter of this network element is set to 0 IEs. The single network element has a network element ID: 10001001 (gNB ID).

Moreover, according to the example, the list of associated entities includes two associated entities. According to the example embodiment, each of a first, a second, and a third associated entity nests one name-contained IOC entity. The fourth associated entity on the bottom of FIG. 11 does not nest a name-contained IOC entity in the present example.

The first associated entity is set to 0 IEs. The first name-contained IOC entity has the IOC Name: gNB-CUCPFunction. The list of associated entities nested in the IOC named gNBCUCPFunction includes one associated entity. This associated entity is set to 0 IE, respectively. Moreover, according to the example embodiment, the associated entity includes a CM attribute with the Attribute Name: PLMN ID (Plane Management Identifier).

The second associated entity is set to 1 IEs. The second name-contained IOC entity has the IOC Name: NRCellCU. The list of associated entities nested in the IOC named NRCellCU includes one associated entity. This associated entity is set to 0 IE, respectively. Moreover, according to the example embodiment, the associated entity includes a CM attribute with the Attribute Name: cellLocalID (Cell Location Identifier).

The third associated entity is set to 1 IEs. The third name-contained IOC entity has the IOC Name: CESManagementFunc. The list of associated entities nested in the IOC named CESManagementFunc includes one associated entity. This associated entity is set to 0 IE, respectively. Moreover, according to the example embodiment, the associated entity includes a CM attribute with the Attribute Name: energySavingState.

The fourth associated entity is set to 1 IEs. The fourth associated entity includes no name-contained IOC entity. According to the example embodiment, the associated entity includes a CM attribute with the Attribute Name: energySavingState.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting parameter, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for a non-real-time radio access network intelligence controller (NRT-RIC) framework in an open radio access network (O-RAN), the apparatus comprising:
   a memory storing instructions; and
   at least one processor configured to implement the NRT-RIC framework of an NRT-RIC by executing the instructions to:
   receive, from an rApp hosted by the NRT-RIC, a first request for retrieving a configuration schema of at least one network element in the O-RAN, the first request comprising a first R1-O1 configuration management (CM) data model identifying the at least one network element, and the first request being received via an R1 interface within the O-RAN architecture between rApps and the NRT-RIC framework; and
   send, from the NRT-RIC framework to the rApp via the R1 interface, a first response to the requested configuration schema, the first response comprising a second R1-O1 CM data model identifying the at least one network element and identifying at least one CM attribute of the at least one network element,
   wherein the R1 interface enables the NRT-RIC framework and the rApp to produce and consume at least one O1 interface related R1 service in the NRT-RIC.

2. The apparatus as claimed in claim 1, wherein the first R1-O1 CM data model comprises:
   a message type parameter identifying a type of the first request; and
   at least one network element parameter comprising a network element identifier (ID).

3. The apparatus as claimed in claim 2, wherein the second R1-O1 CM data model comprises:
   a message type parameter identifying a type of the first response; and
   for each of the at least one network element, a supported Information Object Class (IOC) entity parameter including one or more associated entity items identifying one or more CM attributes.

4. The apparatus as claimed in claim 1, wherein the at least one processor is further configured to execute the instructions to:
   receive, from the rApp, a second request for reading configuration data of a CM attribute, among the at least one CM attribute identified in the first response, the second request comprising a third R1-O1 CM data model identifying a network element and the CM attribute, and the second request being received via the R1 interface; and
   send, from the NRT-RIC framework to the rApp via the R1 interface, a second response comprising a fourth R1-O1 CM data model identifying the CM attribute in response to the second request.

5. The apparatus as claimed in claim 4, wherein the third R1-O1 CM data model comprises:
   a message type parameter identifying a type of the second request;
   an rApp identifier (ID) identifying the rApp;
   a request identifier (ID) for the second request;
   a network element parameter comprising a network element ID of the network element; and
   a first name-contained IOC entity parameter including an IOC entity name and a first associated entity item identifying the CM attribute.

6. The apparatus as claimed in claim 4, wherein the fourth R1-O1 CM data model comprises:
   a message type parameter identifying a type of the second response;
   the rApp ID identifying the rApp;
   a network element parameter comprising the network element identifier (ID);
   a second name-contained IOC entity parameter including the IOC entity name and a second associated entity item identifying the CM attribute.

7. The apparatus as claimed in claim 5, wherein the second associated entity item further includes:
   a CM attribute value identifying a value of the CM attribute.

8. The apparatus as claimed in claim 1, wherein the at least one processor is further configured to execute the instructions to:
   receive, from the rApp, a third request for writing configuration data of a CM attribute, among the at least one CM attribute, the third request comprising a fifth R1-O1 CM data model identifying a network element and the CM attribute, and the third request being received via the R1 interface; and
   send, from the NRT-RIC framework to the rApp via the R1 interface, a third response comprising a sixth R1-O1 CM data model for identifying the CM attribute modified in response to the third request.

9. The apparatus as claimed in claim 8, wherein the fifth R1-O1 CM data model comprises:
   a message type parameter identifying a type of the third request;
   an rApp ID identifying the rApp;
   a network element parameter comprising a network element identifier (ID) of the network element;
   a third name-contained IOC entity parameter including an IOC entity name and a third associated entity item identifying the CM attribute to be modified in response to the third request.

10. The apparatus as claimed in claim 8, wherein the sixth R1-O1 CM data model comprises:
    a message type parameter identifying a type of the third response;
    the rApp ID;
    a network element parameter comprising the network element identifier (ID);
    an attribute status acknowledging the configuration status; and
    a fourth name-contained IOC entity parameter including the IOC entity name and a fourth associated entity item identifying the CM attribute and a status of the writing.

11. The apparatus as claimed in claim 10, wherein, based on the writing not being accepted, the fourth associated entity item further includes:
    a Cause parameter identifying a cause of the writing not being accepted.

12. A method for a non-real-time radio access network intelligence controller (NRT-RIC) framework in an open radio access network (O-RAN), the method comprising:
    receiving, from an rApp hosted by an NRT-RIC, a first request for retrieving a configuration schema of at least one network element in the O-RAN, the first request comprising a first R1-O1 CM data model identifying the at least one network element, and the first request being received via an R1 interface within the O-RAN architecture between rApps and the NRT-RIC framework; and sending, from the NRT-RIC framework to the rApp via the R1 interface, a first response to the requested configuration schema, the first response comprising a second R1-O1 CM data model identifying the at least one network element and identifying at least one configuration management (CM) attribute of the at least one network element, wherein the R1 interface enables the NRT-RIC framework and the rApp to produce and consume at least one O1 interface related R1 service in the NRT-RIC.

13. The method s as claimed in claim 12, wherein the first R1-O1 CM data model comprises:
   a message type parameter identifying a type of the first request; and
at least one network element parameter comprising a network element identifier (ID).

14. The method as claimed in claim 12, wherein the first R1-O1 CM data model comprises:
   a message type parameter identifying a type of the first request; and
   at least one network element parameter comprising a network element identifier (ID).

15. The method as claimed in claim 12, wherein the second R1-O1 CM data model comprises:
   a message type parameter identifying a type of the first response; and
   for each of the at least one network element, a supported Information Object Class (IOC) entity parameter including one or more associated entity items identifying one or more CM attributes.

16. The method as claimed in claim 12, wherein the method further comprises:
   receiving, from the rApp, a second request for reading configuration data of a CM attribute, among the at least one CM attribute identified in the first response, the second request comprising a third R1-O1 CM data model identifying a network element and the CM attribute, and the second request being received via the R1 interface; and
   sending, from the NRT-RIC framework to the rApp via the R1 interface, a second response comprising a fourth R1-O1 CM data model identifying the CM attribute in response to the second request.

17. The method as claimed in claim 12, wherein the method further comprises:
   receiving, from the rApp, a third request for writing configuration data of a CM attribute, among the at least one CM attribute, the third request comprising a fifth R1-O1 CM data model identifying a network element and the CM attribute, and the third request being received via the R1 interface; and
   sending, from the NRT-RIC framework to the rApp via the R1 interface, a third response comprising a sixth R1-O1 CM data model for identifying a CM attribute to be modified in response to the third request.

18. A non-transitory computer-readable recording medium having recorded thereon instructions executable by at least one processor configured to perform a method for a non-real-time radio access network intelligence controller (NRT-RIC) framework in an open radio access network (O-RAN), the method comprising:
   receiving, from an rApp hosted by an NRT-RIC, a first request for retrieving a configuration schema of at least one network element in the O-RAN, the first request comprising a first R1-O1 CM data model identifying the at least one network element, and the first request being received via an R1 interface within the O-RAN architecture between rApps and the NRT-RIC framework; and
   sending, from the NRT-RIC framework to the rApp via the R1 interface, a first response to the requested configuration schema, the first response comprising a second R1-O1 CM data model identifying the at least one network element and identifying at least one configuration management (CM) attribute of the at least one network element,
   wherein the R1 interface enables the NRT-RIC framework and the rApp to produce and consume at least one O1 interface related R1 service in the NRT-RIC.

19. The non-transitory computer-readable as claimed in claim 18, wherein the method further comprises:
   receiving, from the rApp, a second request for reading configuration data of a CM attribute, among the at least one CM attribute identified in the first response, the second request comprising a third R1-O1 CM data model identifying a network element and the CM attribute, and the second request being received via the R1 interface; and
   sending, from the NRT-RIC framework to the rApp via the R1 interface, a second response comprising a fourth R1-O1 CM data model identifying the CM attribute in response to the second request.

20. The non-transitory computer-readable as claimed in claim 18, wherein the method further comprising:
   receiving, from the rApp, a third request for writing configuration data of a CM attribute, among the at least one CM attribute, the third request comprising a fifth R1-O1 CM data model identifying a network element and the CM attribute, and the third request being received via the R1 interface; and
   sending, from the NRT-RIC framework to the rApp via the R1 interface, a third response comprising a sixth R1-O1 CM data model for identifying a CM attribute to be modified in response to the third request.

* * * * *